United States Patent [19]
Smith et al.

[11] 3,989,438
[45] Nov. 2, 1976

[54] METHOD FOR PRODUCING A HOT PRESSED COMPONENT

[75] Inventors: Dexter William Smith; Roland John Lumby, both of Birmingham, England

[73] Assignee: Joseph Lucas (Industries) Limited, Birmingham, England

[22] Filed: July 28, 1972

[21] Appl. No.: 276,043

[30] Foreign Application Priority Data
July 28, 1971 United Kingdom............... 35578/71

[52] U.S. Cl.............................. 264/332; 264/337; 425/78; 249/134; 425/408; 425/354
[51] Int. Cl.² ........................................ B30B 11/02
[58] Field of Search ............... 425/77, 78, 406, 408, 425/412, 415; 18/47 R; 204/332

[56] References Cited
UNITED STATES PATENTS

| | | |
|---|---|---|
| 2,411,379 | 11/1946 | Longhammer........................ 425/78 |
| 2,540,457 | 2/1951 | Rice................................... 425/78 X |
| 2,870,484 | 1/1959 | Livingston ......................... 425/78 X |
| 3,067,465 | 12/1962 | Giardini et al. ............... 18/47 R UX |
| 3,213,491 | 10/1965 | Craig ..................................... 425/78 |
| 3,619,861 | 11/1971 | Lumby................................ 425/412 |

Primary Examiner—J. Howard Flint, Jr.
Attorney, Agent, or Firm—Holman & Stern

[57] ABSTRACT

A method of producing hot pressed products, especially products of complex shapes, wherein the material from which the component is formed is hot pressed between a plurality of die parts of which at least one is of substantially uniform density and substantially compressible. This enables the shape of the die part to conform exactly or nearly so to the shape of the body being sintered throughout hot pressing, thereby resulting in obtainment of products of complex shapes.

7 Claims, 8 Drawing Figures

METHOD FOR PRODUCING A HOT PRESSED COMPONENT

BACKGROUND OF THE INVENTION

1. Field of the Invention

The present invention relates to a method of producing a hot pressed product or component, and more particularly relates to the method of producing a hot pressed product or component of complex shape wherein the material from which the component is formed is hot pressed between a plurality of die parts.

2. Description of the Prior Art

Manufacture or production of hot pressed products or components or complex shapes has heretofore posed a number of serious problems in the art of powder metallurgy. Since, as has been said in this art, powders do not follow the laws of hydrodynamics and do not flow around corners, and since pressures can economically be applied only from the top and bottom of conventional die apparatus, a number of product design limitations have resulted. For example, such shape limitations as undercuts and reverse tapers could not previously be molded, nor could such complex components as turbine blades, helical gears, etc. For some contours it has often been necessary to leave certain areas for subsequent machining or other finishing operations. While many of the typical limitations have been overcome, nevertheless the complicated tooling that has been required has rendered such means uneconomical.

Under the usual conditions of conventional hot pressing, it has not been possible heretofore to produce a sintered component having a complex shape and a uniform density. For example, when conventional tools have been used during hot pressing, to produce complex shapes, the problem has arisen that the shape of the component changes as the size of the component decreases, whereas the shape of the tools have necessarily remained constant during hot pressing. This wording applies to hot pressing a preform and while it is true what is said, it would be normal practice in such circumstances to use a powder charge which leads to non-uniform compaction ratio, causing non-uniformity of density etc. This has tended to lead to distortion of the component and to a final product which has a non-uniform density and therefore internal lines of weakness.

Presently used for the production of components of complex shapes is the so-called isostatic hot pressing method. According to this method, the powdered material from which the component is made is compacted uniformly in all directions in a preformed flexible mold that is immersed in fluid in a pressure vessel. While this technique has led to the obtainment of components of more uniform density and virtually eliminated die wall friction, it has nevertheless has a number of serious drawbacks, especially in the case of sintering of powders having a high melting point such as the borides, nitrides, carbides, etc. In such a case the major problem is the containment of the material to be hot pressed in a die without explosion of the die band. Moreover, since during isostatic hot pressing, the powder is sintered in a closed container, the moisture and gases contained therein are released and consequently react with the powder itself. When the powder is nitride powder, decomposition of the nitride is promoted under these conditions. By means of the present invention, however, these known disadvantages can be overcome, and the production of components of complex shapes and uniform densities can be cheaply and conveniently effected with conventional apparatus and equipment. Using the method of this invention, it is possible to ensure that the tools conform exactly, or with a minor discrepancy that can be taken up during hot pressing, to the shape of the component throughout the hot pressing process.

SUMMARY OF THE INVENTION

In one aspect of the invention, a method is effected by apparatus for producing a hot pressed product or component, especially one with a complex shape, from a ceramic or nonceramic material, comprising in the method a heating means, such as a conventional type furnace; and a pressing means, such as, essentially, a conventional die assembly or apparatus having a plurality of die parts except for the fact that, for at least one of the die parts to which pressure is applied in use, special requirements attach which are of significance in attaining the benefits to be derived from practice of the present invention. Such requirements include, for at least one said die part, that it have a substantially uniform density and that it be substantially compressible under conventional hot pressing conditions. It is to be appreciated that conventional die parts will unintentionally be compressed to a very small extent during hot pressing, but by the terminology "substantially compressible" is meant a degree of compressibility that is much greater than heretofore known in conventional hot pressing. Also it is to be appreciated that when hot pressing is performed with a conventional die part, the small, unintentional amount of the deformation of the die part which will occur, will immediately disappear when the conditions of stress are removed and the die part will return to its original shape. In said at least one die part of the invention, the substantial amount of deformation of the die part which occurs on hot pressing, will not immediately disappear on removal of the conditions of stress and the die part will not automatically recover its original shape.

As a primary aspect of the invention, there is provided a method of producing a hot pressed product or component, especially one with a complex shape, from a conventional material, comprising positioning the material to be hot pressed in a die cavity defined between a plurality of die parts of which at least one die part to which pressure is applied is capable of being substantially compressed under hot pressing conditions and is of substantially uniform density; and applying pressure to said die parts and said material under conditions of elevated temperature sufficient to compress substantially at least said one die part and to produce the hot pressed product or component.

The products or components that can be produced by this invention include all those, both ceramic and non-ceramic, that are produced by conventional hot press methods such as the following non-limiting examples of refractory ceramic materials; the oxide refractories, e.g. alumina, magnesia, etc., non-metallic nitrides such as boron nitride, silicon nitride, etc; refractory carbides such as silicon carbide, etc; and the following non-limiting examples of non-ceramic materials; metal powders such as those of iron, iron alloys, steel, steel alloys, etc.

As broadly contemplated, the present invention is intended to be effected under the usual hot pressing or pressure sintering conditions with conventional apparatus and equipment, whereby densification under pressure of any of the foregoing representative ceramic or non-ceramic materials is achieved. Thus, the standard procedure consists in the single operation of pressing (compacting or briquetting) the powder to the desired shape and heating (sintering) the compact at a temperature well below the melting point of the material. Hot pressing is usually conducted at temperatures upwards of 1500° C., e.g. 1600° – 18° C., at pressures in the range of 1000 p.s.i. – 5000 p.s.i., and for times up to 60 minutes. Standard mixing and blending equipment, such as double-cone mixers, "Y"-cone powder blenders, or ball mills, etc., can be used to prepare the metallic or non-metallic powders or mixtures thereof, or blend fractions of a given powder of different sizes to secure the particle-size distribution most favourable for further processing. For example, in the case of silicon nitride, a preferred product or component to be made herein, a suitable particle size is below about 8 microns. Compacting is usually effected in mechanical or hydraulic presses, which are, or can be provided with furnace means to achieve the elevated temperatures required. It is contemplated herein that gas generators can be utilized, if desired, to achieve the controlled atmospheric conditions that are often used in sintering operations.

A significant aspect of the invention is concerned with the novel method effected by the die apparatus herein. In general, conventional die apparatus, such as fixed dies with single or multiple (double) action pressing, movable dies utilizing a process for component withdrawal, or so-called floating dies, which compact by double action in a single-action press, can be utilized herein. However, for purposes of this invention, it is preferred that any and all such die apparatus used in the novel method comprise a plurality, preferably one or more pairs of die parts defining therebetween a cavity, with at least one of the die parts being substantially compressible and of substantially uniform density. It is particularly desirable that the material of which said one die part is made be different from the material to be hot pressed, and that the ratio of the density of said one die part, prior to hot pressing, to the density of the die part, after hot pressing, be substantially equal to the ratio of the density of the material to be hot pressed to the density of the hot pressed component. For purposes of simplification, this relationship can alternatively be expressed as one of compression ratios, e.g. the compression ratio of the respective densities of the material to be pressed before and after hot pressing to the compression ratio of the corresponding densities of the substantially compressible die part(s) before and after hot pressing. This is of particular significance in that it enables the operator to make and use die parts (to compress the material to be hot pressed) to conform accurately to the shape of the material being compressed throughout hot pressing. The compression ratios of these respective entities can be the same or different, and can be controlled, for example, through the choice of materials utilized for the die and/or the product or component desired. When the respective compression ratios of the die parts and of the material to be hot pressed are different, the resulting discrepancies in shape as between the die part(s) and the component to be formed can be gradually taken up during pressing, if minor in nature.

It is preferred that said one die part be formed from a powder material chosen so as to be non-respective with the material to be hot pressed and so as to remain in powder form at said elevated temperature. Preferably, where the material to be hot pressed is silicon nitride, said one die part is formed of boron nitride.

In one embodiment of the invention, the powder material can be compacted to form said one die part of substantially uniform density. In an alternative embodiment, the powder material can be formed into a solid-containing fluid such as a dough which can then be molded to produce said one die part of substantially uniform density.

It is recognized that large and/or abrupt changes should be avoided since the powder distribution would not be uniform and control of shrinkage during sintering would be difficult. Thus, in the event abrupt changes in height are required, it is frequently possible to press the powder to a preform having more gradual changes. In preferred embodiments of this invention preforms are extensively made of.

DESCRIPTION OF THE PREFERRED EMBODIMENTS

Figure 1:
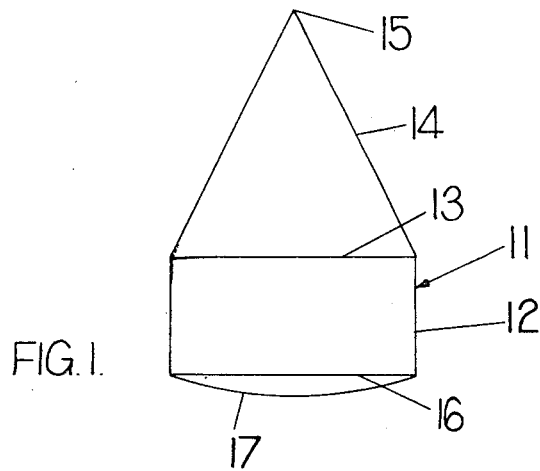
FIG. 1 is a side view of a hot pressed, silicon nitride component manufactured by using the novel method in accordance with the invention.
Figure 2:
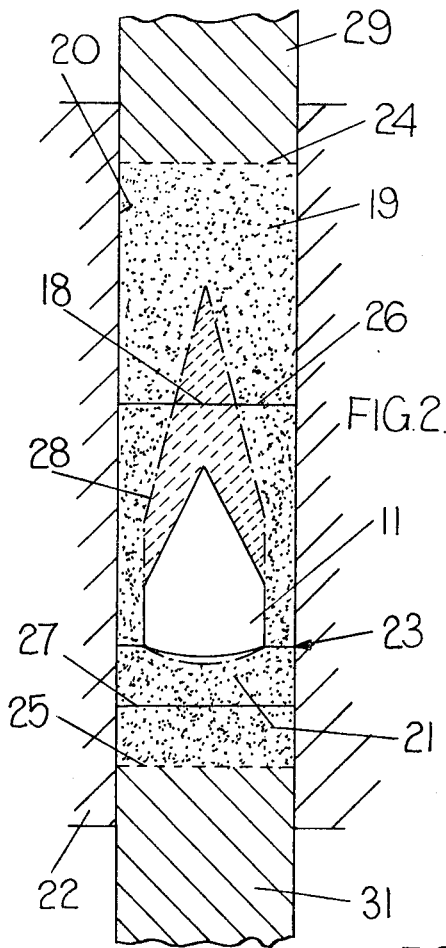
FIG. 2 is a diagrammatic sectional view of apparatus for effecting the invention when in use for manufacturing the component shown in FIG. 1.

Referring to FIGS. 1 and 2, apparatus for effecting the invention is shown where it was required to manufacture a hot pressed, silicon nitride component indicated at 11 in FIG. 1. The component 11 comprised a body portion 12 in the form of a cuboid of height 10 mm, width 20 mm and depth 10 mm. Extending from the top surface 13 of the body portion 12 and formed integrally with the body was a wedge portion 14, the tip 15 of the wedge being positioned at 20 mm above the surface 13 and the base of the wedge extending over the whole area of the surface 131. Further, an integral, part-cylindrical portion 17 projected from the lower surface 16 of the body portion 12 so as to extend over the entire area of the surface 16. The axis of the portion 17 was defined by the tip 15 of the wedge portion 14 so that the radius of the curved surface of the portion 17 was approximately 31.5 mm and the lowermost point on the curved surface was positioned 1.5 mm below the lower surface 16 of the body portion 12. The finished component 11 was to have a density of 3.2 gm/c.c. which was required to be substantially constant over the whole of the component. In the particular apparatus shown in FIGS. 1 and 2, to manufacture the component, silicon nitride powder substantially in its α-phase together with 1% by weight of magnesium oxide was initially compacted as a preform 18 of predetermined shape and having a substantially constant density of 1.6 gm/c.c. As shown in FIG. 2, the preform 18 was then formed into the component 11 by positioning the preform between a pair of die parts 19, 21 and then, with the assembly at an elevated temperature, applying pressure to the die parts from opposite directions, respectively, so that the pressure was transmitted by the die parts to the preform 18 and the preform was hot pressed into the component 11. It will therefore be appreciated that the shaping of the preform 18 was dictated by the fact that, although the dimensions of the preform in a direction perpendicular to the axis of hot pressing remained substantially constant during production of the component, the dimensions in a direction parallel to the axis of the hot pressing had to decrease by a factor of 2, as compared with the corresponding dimensions of the components 11, if the component was to have the required final density of 3.2 gm/c.c.

Figure 2A:
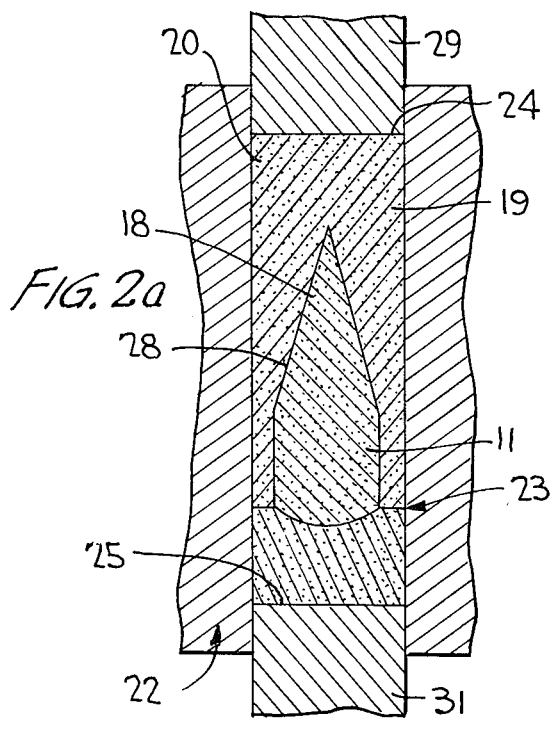
FIG. 2a is a view incorporating portions of FIG. 2, diagrammatically illustrating the compressable preform and compressable die parts prior to the hot pressing step.

Dealing now in more detail with the apparatus used to hot press, as seen in FIGS. 2 and 2a, the preform 18, the die parts 19, 21 were positioned in a bore 20 defined within a die 22 and were shaped so that, when assembled, they defined a die cavity which conformed substantially exactly to the shape of the preform 18. Each of the die parts 19, 21 was formed from boron nitride powder which had been isostatically compacted to a substantially uniform, predetermined density, the density being arranged so that each die part was capable of further compaction. Thus, it will be appreciated that during hot pressing of the preform 18, each of the die parts 19, 21 also underwent compression. In this particular method, the initial density of each die part was further arranged so that the amount of compression the die part underwent during hot pressing was such that the ratio of the density of the die part prior to hot pressing to the density after hot pressing was equal to the compression ratio of the silicon nitride, which it will be appreciated has a value of 2. This was the preferred arrangement since, with the die parts 19, 21 being initially shaped so that the die cavity defined therebetween conformed exactly to the shape of the preform 18, there was the same exact conformity between the shapes of the silicon nitride body and the die cavity throughout the hot pressing process as the body and die cavity decreased its size. In this way, it was found to be possible to produce a silicon nitride component having a very high degree of surface accuracy. Thus, before compacting the boron nitride powder into each die part 19, 21 it was necessary to calculate from the parameters to be used in the process a value for the maximum density each die part could achieve during hot pressing. In this particular example, it was calculated that the maximum density of each boron nitride die part after hot pressing would be 2.2 gm/c.c. and, so as to obtain the required compression ratio of 2, the boron nitride powder used to produce the die parts was compacted to a uniform density of 1.1 gm/c.c.

Figure 2B:
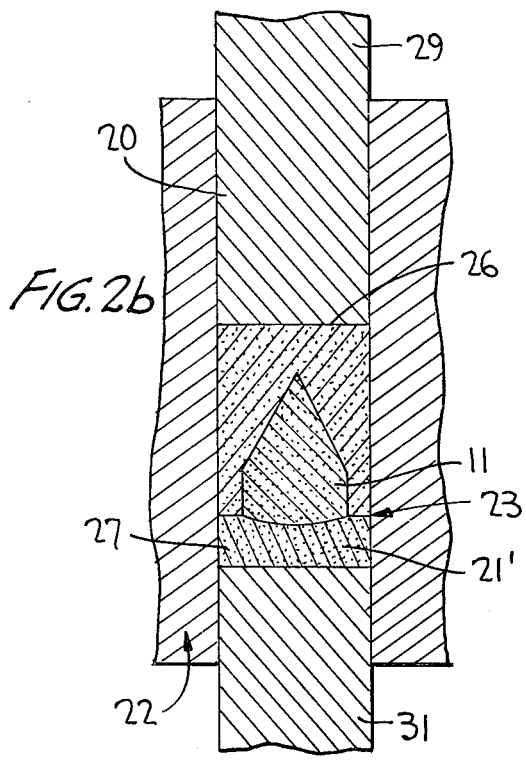
FIG. 2b is a view incorporating portions of FIG. 2, diagrammatically illustrating the compressed die parts

To illustrate the changes which occurred on hot pressing of the component 18, the positions of the various components before and after hot pressing are shown in FIG. 2, 2a and 2b. Thus, the continuous line 23 defines the split line of the die, i.e. the interface between the die parts 19, 21 and the lines 24, 25 in FIG. 2a define the positions, prior to hot pressing, of the die parts 19, 21 respectively relative to the split line 23. The positions of the die parts 19, 21 after hot pressing are defined by the continuous lines 26, 27 in FIG. 2b, whereas the line 28 in FIG. 2a defines the interface between the preform 18 and the die cavity defined between the die parts prior to hot pressing.

In the actual example of this method described, the die part 19 extended to a distance of 80 mm above the split line 23 prior to hot pressing, at which stage the die part 21 extends to a distance of 20 mm from the split line 23. To effect hot pressing, a pair of graphite punches 29, 31 were moved into the die cavity 20 from opposite ends thereof so as to contact the die parts 19, 21. The whole die assembly was then positioned within a furnace (not shown) and the temperature of the furnace was raised to between 1700° and 1800° C. At the same time, a pressure of about 1.5 tons/square inch was applied by the punches 29, 31 to the die parts 19, 21 respectively, and the preform 18 so as to hot press the preform. After hot pressing, the die parts 19', 21', 2b were separated and the hot pressed component removed. The die parts 19', 21', 2b were found to have been compressed during the hot pressing process so as to extend to positions spaced 40 mm and 10mm respectively from the split line 23 of the die.

Figure 3:
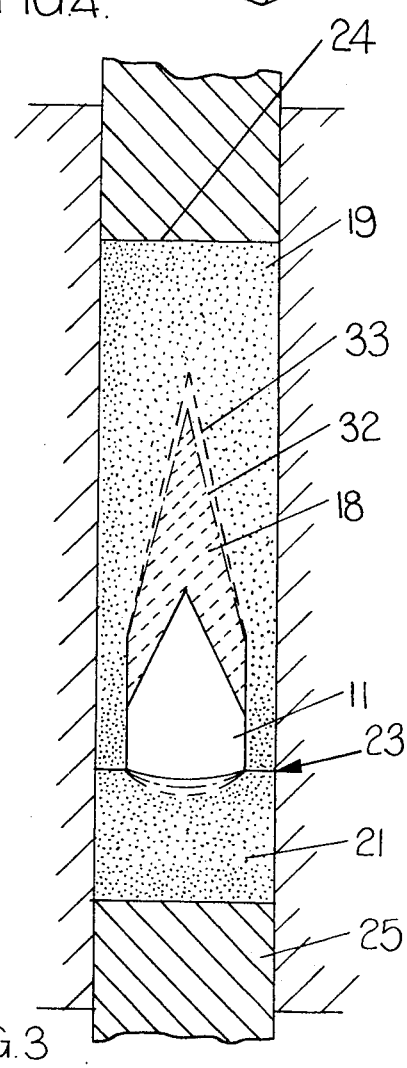
FIG. 3 is a diagrammatic sectional view of apparatus for effecting the invention, also when in use for manufacturing the component shown in FIG. 1.
Figure 3A:
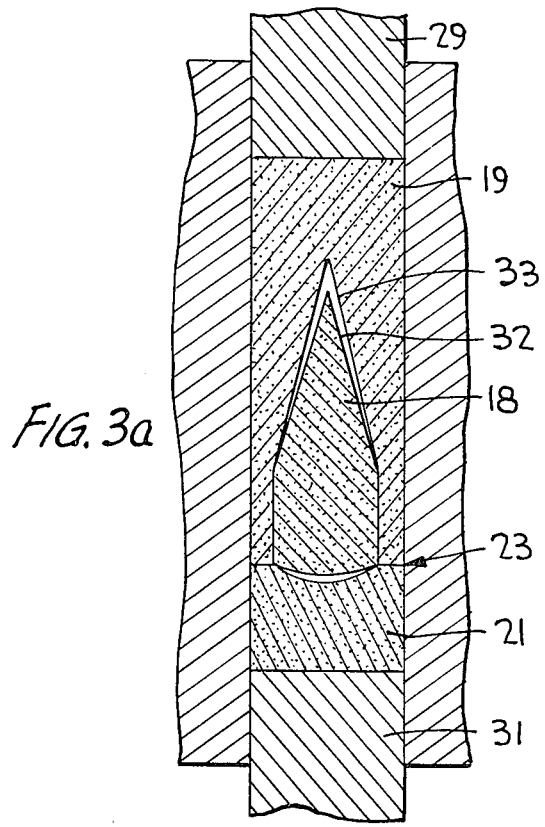
FIG. 3a is a view incorporating portions of FIG. 3, diagrammatically illustrating the compressable die parts prior to the hot pressing step.
Figure 3B:
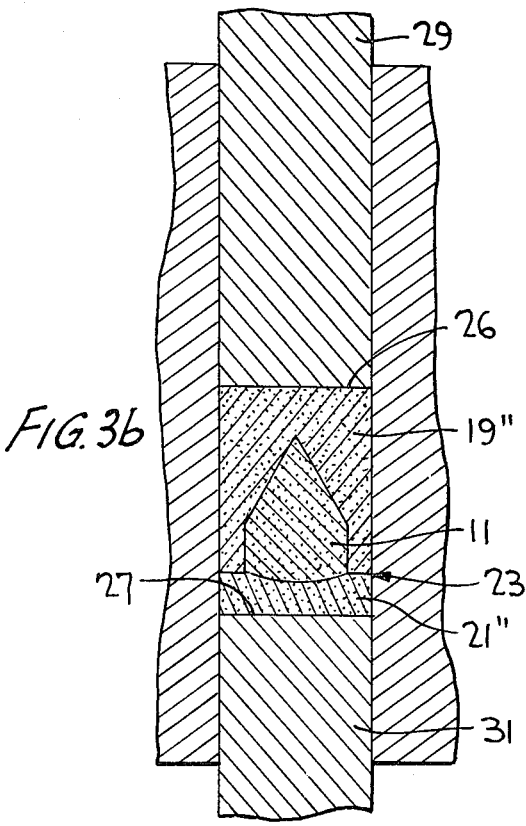
FIG. 3b is a view incorporating portions of FIG. 3 and diagrammatically illustrating the compressed die parts and preform after the hot pressing step.

In another method, as shown in FIG. 3, 3a and 3b similar apparatus to that described above was used to effect or produce a hot pressed component of the type shown at 11 in FIG. 1. However, in this example, the ratio of the density of each of the die parts 19, 21 before hot pressing to the density after hot pressing was arranged to be greater than the ratio density of the preform 18 to the density of the component 11. Thus, during hot pressing, the die parts 19, 21 and the preform 18 were compressed by differing amounts and so it was necessary to arrange that the die cavity, defined between the die parts, did not conform accurately to the shape of the preform 18. In particular, it was necessary to arrange that the dimensions of the die cavity in a direction parallel to the axis of hot pressing exceeded the corresponding dimensions of the preform 18. This can be seen in FIG. 3 and 3a by referring to the relative positions of the line 32 and line 33 which illustrate, respectively, the shapes prior to hot pressing of the preform 18 and die cavity defined between the die parts 19, 21.

In FIG. 3 and 3a the die parts 19, 21 were arranged to extend to positions spaced 88 mm and 22 mm respectively from the split line 23 prior to hot pressing, whereas after hot pressing, the die parts 19'' and 21 in FIG. 3b extended to positions spaced 40 mm and 10 mm respectively from the split line 23. Thus the compression ratio of die parts 19, 21 initially was 2.18 to 1 whereas the compression ratio of the preform 18 was again arranged to be 2 to 1 after pressing. It is of course to be appreciated that, although to allow for the difference in compression ratios, the die cavity defined between the die parts 19, 21 did not conform accurately to the shape of the preform 18 before hot pressing, the space gradually assumed the shape of the silicon nitride components received therein as the hot pressing operation proceeded. Thus, it was found that the required uniformly dense component 11 was still obtained by the illustrated method.

It is to be appreciated that, if required, each die part 19, 21 could be arranged to be compressed by a different amount during the hot pressing process. Also, in some cases, satisfactory results could be obtained by arranging that the compression ratio of each die part was less than the ratio of the density of the preform 18 to the density of the component 11.

In a further method of the invention (not illustrated a silicon nitride preform was hot pressed between a pair of movable die parts molded from a dough consisting of 54% boron nitride, 45% water, and 1% celacol. The moldings produced from the dough were heated prior to insertion in the hot pressing die, so as to remove the water and produce the required uniformly dense die parts. As in the previous embodiments, the molded die parts were compressed during hot pressing of the preform into the required component. Also, in one particular aspect of this third preferred embodiment, it was found that, provided the ratio of the initial density of each die part to the final density of the die part was equal to the ratio of the density of the preform to the density of the final component, then it was possible to mold the die parts around the preform.

In each of the methods executed as described above, it was found to be preferable to reduce to a minimum the amount of material of the die parts defined between the component being hot pressed and the wall of the bore in the hot pressing die and between the component and the hot pressing punches. Otherwise, it was found that there was a tendency for some degree of distortion to be produced in the resultant product, particularly in the form of the walls of the product being pushed outwardly or inwardly in a direction perpendicular to the hot pressing axis.

It is to be appreciated that in the previous examples, where silicon nitride was being hot pressed, boron nitride powder was used as the material of the compressible die parts since boron nitride did not react chemically with silicon nitride during hot pressing and also remained in powder form at the elevated temperature of the hot pressing process. In addition, it was found that boron nitride could readily be removed from the hot pressed silicon nitride component. It is, however, to be appreciated that other powder materials, as previously indicated, which exhibit the above properties of boron nitride could have been used in the compressible die parts used to hot press the silicon nitride.

Also it is to be appreciated that, in the embodiments described above, it would have been possible to arrange the method so that only one of the die parts was compressible during the hot pressing process. Thus, for example, one of the die parts could have been formed from compacted boron nitride powder while the other die part could have been a conventional graphite die part.

Further, it is to be appreciated that the methods described in the above examples could have been used to produce a plurality of hot pressed components in a single operation. In such a modification, the required number of preformed components would first be assembled between respective pairs of die parts, whereafter the die parts would be positioned within a die cavity in a horizontally disposed furnace and arranged in series relationship in the die cavity with a pressure pad being interposed between each pair of die parts. Then the temperature of the furnace would be raised and pressure applied to the preforms by way of the pressure pads so as to simultaneously hot press the preforms received within the die cavity and produce the required plurality of hot pressed components.

It is to be appreciated that various powder mixtures are utilizable in the practice of this invention, e.g. mixtures of powders of different metals of the same or different particle sizes, mixtures of powders of different non-metallic ceramic materials of the same or different particle sizes, mixtures of the preceding two types of mixtures of the same or different particle sizes, etc.

Figure 4:
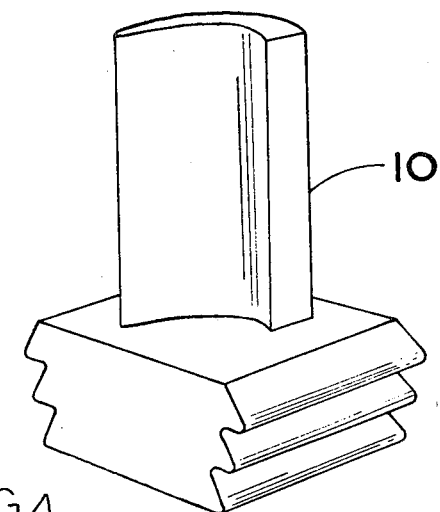
FIG. 4 is a perspective illustration of a turbine blade, just one of the many types of components of complex shape that can be produced by the method of this invention.

It is also to be appreciated that only a relatively small number of representative examples of complex forms and shapes have been described above and illustrated in the drawings; see the turbine blade 10 of FIG. 4, for example, from the almost infinite number and variety of such forms and shapes that exist in the art. Therefore, it is to be recognised that numerous other forms and shapes of components are within the purview of this invention. For example, on page 99 of *Powder Metallurgy for Engineers*, by R.H.T. Dixon and A. Clayton, published in the United Kingdom by the Machinery Publishing Co. Ltd. (1971), there are shown a number of additional components that could be produced by the present invention; the various forms and shapes shown therein are hereby incorporated by reference herein as exemplary of this fact.

It is also to be appreciated that other means for controlling the above compression ratio's, apart from the nature of materials used for the die part and component desired, are within the purview of this invention. An example of this can be given the use of preforms (wherein partially compacted powders can be used) and the use of varying heights and amounts of sintering material to be placed in the die cavity for pressure sintering.

It should be understood from the foregoing that the above description is merely illustrative of preferred embodiments and specific examples of the present invention and that in all of which embodiments and examples, variations, such as those previously described, can be made by those skilled in the art without departing from the spirit purview thereof, the invention being defined by the following claims.

We claim:
1. A method of producing a hot pressed component comprising the steps of: positioning material to be hot pressed in a die cavity defined between a pair of die parts, at least one of the die parts being substantially compressible during hot pressing of said material and being of substantially uniform density, and applying pressure to the die parts at an elevated temperature so as to compress said one die part and (simultaneously hot press) so as to cause pressure to be transmitted by the die parts to said material so that the material is simultaneously hot pressed by the die parts into said components, the material of said one die part different from the material to be hot pressed, and the density of said one die part remaining substantially uniform after hot pressing and being arranged so that the ratio of the density thereof, prior to hot pressing, to the density thereof, after hot pressing, is substantially equal to the ratio of the density of the material to be hot pressed to the density of the hot pressed component.

2. A method as claimed in claim 1 wherein said die cavity is substantially completely filled by the material to be hot pressed.

3. A method as claimed in claim 1 wherein the material to be hot pressed is a silicon nitride compact and said one die part is formed of boron nitride.

4. A method of producing a hot pressed component comprising the steps of positioning material to be hot pressed in a die cavity defined between a pair of die parts, at least one of the die parts being substantially compressible during hot pressing of said material and being of substantially uniform density, and applying pressure to the die parts at an elevated temperature so as to compress said one die part and so as to cause pressure to be transmitted by the die parts to said material so that the material is simultaneously hot pressed by the die parts into said component, the density of said one die part remaining substantially uniform after hot pressing and being arranged so that the ratio of the density thereof prior to hot pressing to the density thereof after hot pressing is different from the ratio of the density of the material to be hot pressed to the density of the hot pressed component, and said cavity being less than substantially completely filled by the material to be hot pressed and gradually conforming to the shape of said material as the material is compressed during the hot pressing operation.

5. A method as claimed in claim 4 wherein said one die part is formed from a powder material being non-reactive with the material to be hot pressed.

6. A method as claimed in claim 4 wherein the material to be hot pressed is a silicon nitride compact and said one die part is formed of boron nitride.

7. A method as claimed in claim 1 wherein said one die part is formed from a powder material being non-reactive with the material to be hot pressed.

* * * * *